US011711792B2

(12) United States Patent
Zhu et al.

(10) Patent No.: US 11,711,792 B2
(45) Date of Patent: Jul. 25, 2023

(54) TWO-TIER SECTOR RF BEAMFORMING ADAPTATION

(71) Applicant: Intel Corporation, Santa Clara, CA (US)

(72) Inventors: Jing Zhu, Portland, OR (US); Ehsan Aryafar, Santa Clara, CA (US); Sarabjot Singh, Santa Clara, CA (US); Nageen Himayat, Fremont, CA (US); Wook Bong Lee, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 987 days.

(21) Appl. No.: 16/088,310

(22) PCT Filed: Jul. 7, 2016

(86) PCT No.: PCT/US2016/041389
§ 371 (c)(1),
(2) Date: Sep. 25, 2018

(87) PCT Pub. No.: WO2018/009204
PCT Pub. Date: Jan. 11, 2018

(65) Prior Publication Data
US 2020/0374855 A1 Nov. 26, 2020

(51) Int. Cl.
H04W 56/00 (2009.01)
H04W 72/044 (2023.01)
(Continued)

(52) U.S. Cl.
CPC ....... H04W 72/046 (2013.01); H04J 11/0076 (2013.01); H04W 48/08 (2013.01);
(Continued)

(58) Field of Classification Search
CPC . H04W 72/046; H04W 48/08; H04W 72/042; H04W 74/0833; H04W 48/12;
(Continued)

(56) References Cited

U.S. PATENT DOCUMENTS

2013/0301454 A1   11/2013  Seol et al.
2015/0049824 A1*  2/2015  Kim ................... H04B 7/0617
                                                       375/267
(Continued)

FOREIGN PATENT DOCUMENTS

WO    2015/109153 A1    7/2015
WO    2016/086144 A1    6/2016
(Continued)

OTHER PUBLICATIONS

U.S. Appl. No. 62/310,795, filed Mar. 20, 2016, pp. 1-27 (Year: 2016).*
(Continued)

Primary Examiner — Salvador E Rivas
(74) Attorney, Agent, or Firm — Spectrum IP Law Group LLC

(57) ABSTRACT

Briefly, in accordance with one or more embodiments, an apparatus of a user equipment (UE) comprises baseband circuitry including one or more processors to decode a secondary synchronization signal (SSS) or a beam reference signal (BRS) received from an evolved Node B (eNB) to select a Tier-1 sector for receiving downlink transmissions from the eNB, decode a downlink control channel message received from the eNB at one or more fixed time offsets after the UE decodes the SSS to obtain index information for the Tier-1 sector to identify the Tier-1 sector, and if the Tier-1 sector has changed initiate a random access procedure to select an updated Tier-1 sector, and generate an updated Tier-1 sector index message to report to the eNB.

7 Claims, 8 Drawing Sheets

(51) Int. Cl.
   *H04J 11/00* (2006.01)
   *H04W 48/08* (2009.01)
   *H04W 74/08* (2009.01)
   *H04W 72/23* (2023.01)
   *H04W 48/12* (2009.01)

(52) U.S. Cl.
   CPC ......... *H04W 48/12* (2013.01); *H04W 56/002* (2013.01); *H04W 72/23* (2023.01); *H04W 74/0833* (2013.01)

(58) Field of Classification Search
   CPC .. H04W 56/002; H04J 11/0076; H04B 7/086; H04B 7/0617; H04B 7/0404
   See application file for complete search history.

(56) References Cited

U.S. PATENT DOCUMENTS

| | | | |
|---|---|---|---|
| 2015/0055485 A1 | 2/2015 | Kim et al. | |
| 2015/0131750 A1* | 5/2015 | Xue | H04B 7/0452 375/267 |
| 2017/0251460 A1* | 8/2017 | Agiwal | H04W 72/0406 |
| 2017/0302355 A1* | 10/2017 | Islam | H04W 72/042 |
| 2017/0318541 A1* | 11/2017 | Islam | H04W 52/42 |
| 2019/0104549 A1* | 4/2019 | Deng | H04L 27/2607 |
| 2020/0296765 A1* | 9/2020 | Kim | H04W 74/0833 |
| 2020/0314908 A1* | 10/2020 | Hwang | H04W 74/0833 |
| 2021/0127424 A1* | 4/2021 | Yasukawa | H04W 16/28 |

FOREIGN PATENT DOCUMENTS

| | | | | |
|---|---|---|---|---|
| WO | WO-2017180173 A1 * | 10/2017 | ......... | H04B 7/0695 |
| WO | 2018/009204 A1 | 1/2018 | | |

OTHER PUBLICATIONS

T. Nitsche, C. Cordeiro, A. B. Flores, E. W. Knightly, E. Perahia and J. C. Widmer, "IEEE 802.11ad: directional 60 GHz communication for multi-Gigabit-per-second Wi-Fi [Invited Paper]," in IEEE Communications Magazine, vol. 52, No. 12, pp. 132-141, Dec. 2014, doi: 10.1109/MCOM.2014.6979964. (Year: 2014).*

Assasa, Hany and Widmer, Joerg, "Implementation and Evaluation of a WLAN IEEE 802.11ad Model in ns-3", Jun. 15-16, 2016, pp. 57-64 (Year: 2016).*

International Preliminary Report on Patentability received for International Application No. PCT/US2016/041389, dated Jan. 17, 2019, 15 pages.

Heath, et al., "An Overview of Signal Processing Techniques for Millimeter Wave MIMO Systems," journal, Apr. 2016, 41 pages, vol. 10, Issue 3, IEEE, New York, US.

International Search Report and Written Opinion received for International Application No. PCT/US2016/041389, dated May 3, 2017, 21 pages.

Nitsche, et al., "IEEE 802.11 ad: Directional 60 GHz Communication for Multi-Gigabit-per-Second Wi-Fi," Magazine, Dec. 2014, pp. 132-141, vol. 52, No. 12, IEEE, Piscataway, US.

* cited by examiner

TWO-TIER SECTOR RF BEAMFORMING ADAPTATION

RELATED APPLICATIONS

The present application is the National Stage Application of International Application No. PCT/US2016/041389 filed Jul. 7, 2016, entitled TWO-TIER SECTOR RF BEAMFORMING ADAPTATION. Said Application No. PCT/US2016/041389 is hereby incorporated herein in its entirety for all purposes.

BACKGROUND

Higher frequency access systems such as millimeter wave (mmWave) systems involve directional beamforming at the base station, access point, or evolved Node B (eNB) BS/AP and the user equipment (UE) or station in order to achieve the signal-to-noise ratio (SNR) needed for establishing a communication link. Directional acquisition procedures allow the eNB and the UE to determine the best transmit and receive beamforming directions and beams for establishing and maintaining a directional connection with the specified SNR, and are therefore critical to the design of higher frequency and mmWave access systems.

For beam acquisition during initial access, wherein the UE first connects to a mmWave cell, it is important to address connected mode procedures for maintaining, tracking, or adapting the beam directions after initial acquisition due to user mobility and dynamically changing channel conditions. In principle, the initial acquisition procedure may be repeated after a loss of beam direction, such procedures are expensive in terms of acquisition latency and overhead and may lead to excessive interruptions during the course of a connection.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
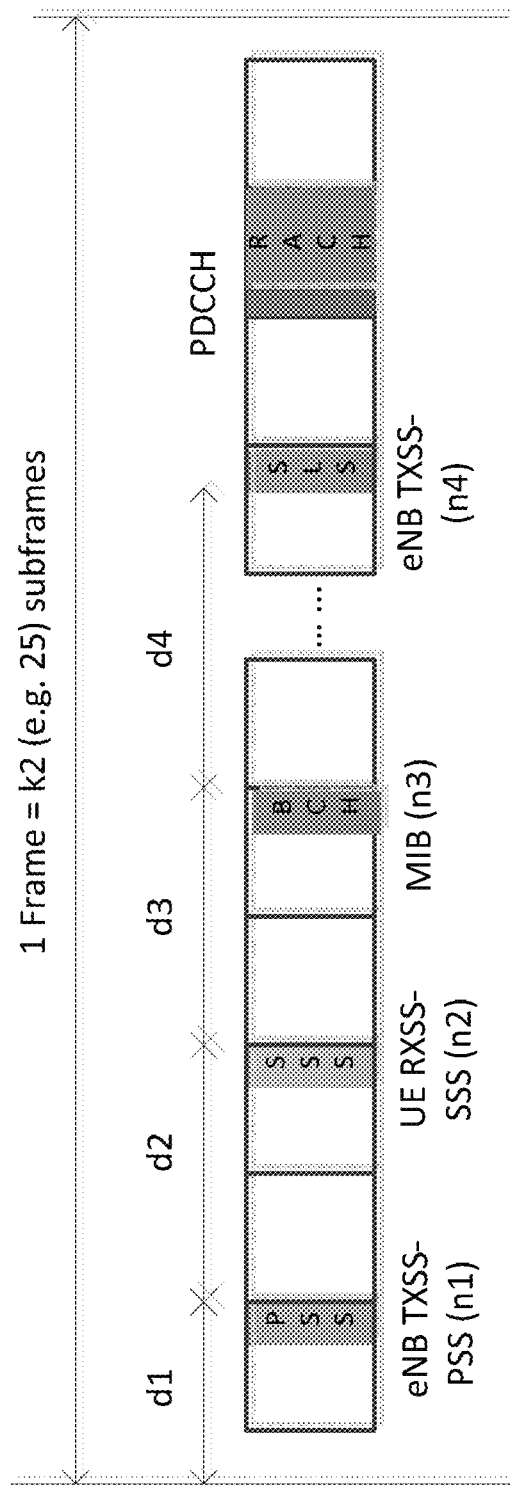
FIG. 1 is a diagram of an example frame structure in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled, however, may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over", however, may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an example frame structure in accordance with one or more embodiments will be discussed. FIG. 1 shows an example frame structure for initial acquisition. The design of frame structure 100 accommodates an initial acquisition procedure for Fifth Generation (5G) mmWave radio access technology (RAT) in which a two-tier radio-frequency (RF) beaming architecture is utilized on the eNB side. In such an architecture, the Tier-1 sector has broader coverage using fewer beams which is suitable for a low data-rate control channel such as a broadcast channel or random-access channel (RACH), and the Tier-2 sector has narrower coverage using more beams which is suitable for a high data-rate data channel. The frame structure 100 of FIG. 1 accommodates an evolved Node B (eNB) transmit sector sweep (TXSS) primary synchronization signal (PSSS), a user equipment (UE) receive sector sweep (RXSS) secondary synchronization signal (SSS), a master information block (MIB), broadcast channel (BCH), sector level sweep (SLS), and random-access channel (RACH) which may be scheduled dynamically by physical downlink control channel (PDCCH). An initial acquisition procedure using frame structure 100 is shown in and described with respect to FIG. 2, below.

Figure 2:
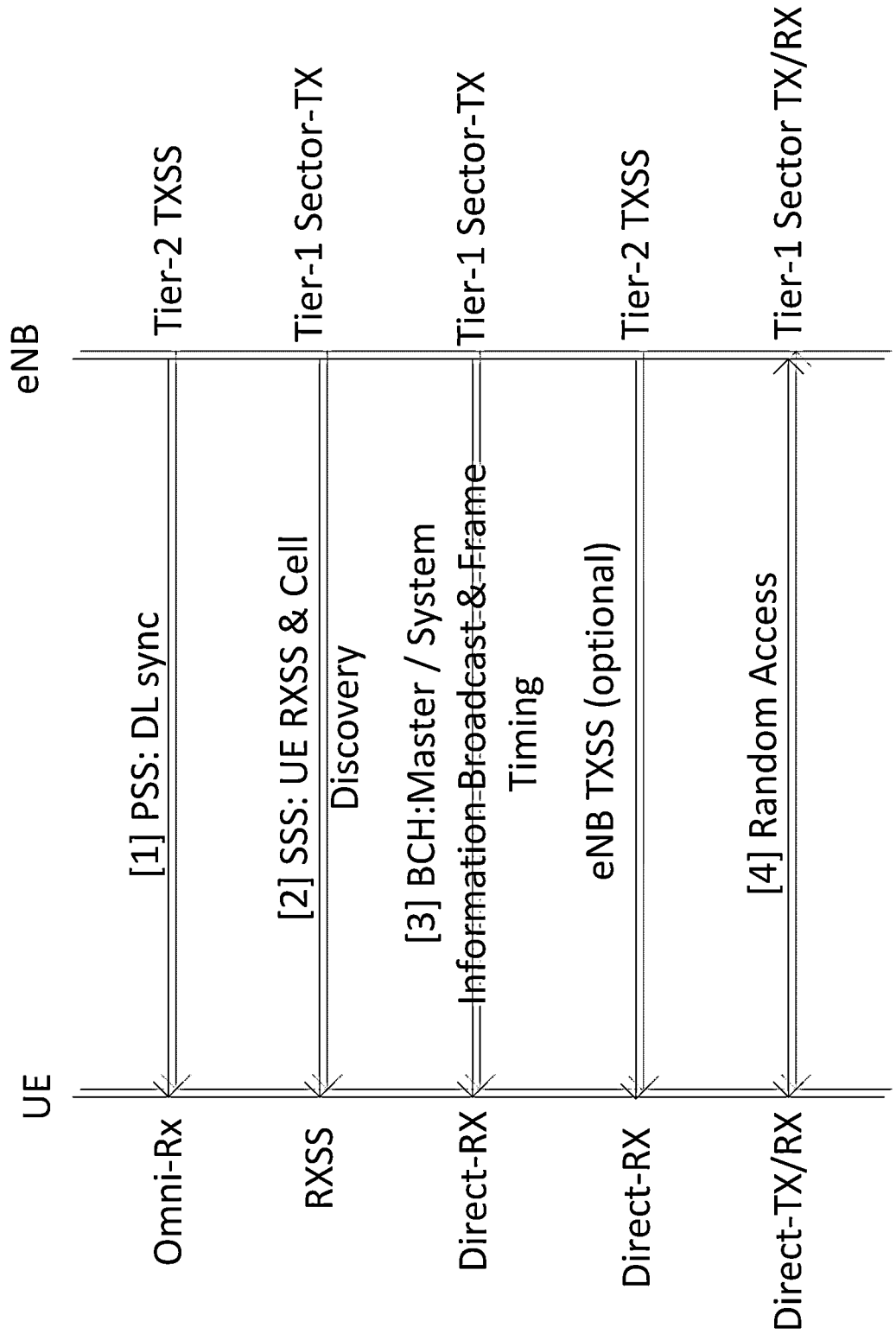
FIG. 2 is a diagram of an initial acquisition procedure in accordance with one or more embodiments.

Referring now to FIG. 2, a diagram of an initial acquisition procedure in accordance with one or more embodiments will be discussed. FIG. 2 illustrates an example initial acquisition procedure 200 comprising three synchronization operations with primary and secondary synchronization sequences (PSS/SSS). A first operation comprises downlink synchronization for an eNB 112 transmit sector sweep (TXSS) primary synchronization sequence (PSS) with eNB Tier-2 TXSS and UE Omni-RX. A second operation comprises initial acquisition and cell discover for a UE 110 receive sector sweep (RXSS) secondary synchronization sequence (SSS) with eNB Tier-1 TX and UE RXSS. A third operation comprises selecting the best eNB Tier-2 sector for an eNB 112 TXSS with eNB Tier-2 TXSS and UE Direct-RX.

The two SSS-based synchronization channels are designed mainly for initial acquisition, but may also be used for sector adaptation after UE 110 is attached. For example, UE RXSS-SSS may be allocated frequently, for example every 40 milliseconds (ms), and may be used by UE 110 to select the best UE sector after UE 110 is attached. The UE RXSS-SSS, however, may be limited for selecting the best Tier-1 sector or Tier-2 sector for eNB 112, for example there is no additional control info such as a sector identifier (ID) encoded in SSS during UE RXSS. As a result, in one or more embodiments of initial acquisition procedure 200, UE 110 may decode the broadcast (BCH) channel to obtain the eNB Tier-1 sector index. In one or more embodiments, two approaches to identify the eNB Tier-1 sector index after UE RXSS-SSS are described herein, below. Furthermore, eNB 112 may have many Tier-2 sectors, being narrow sectors, and it may take a long time to scan all the eNB Tier-2 sectors, for example hundreds of milliseconds. Therefore further enhancements are required to improve beam adaptation procedure to facilitate frequent re-acquisition of eNB Tier-2 sectors. Therefore, one or more embodiments discussed herein, below, are directed to how to dynamically trigger and reselect the Tier-1 and Tier-2 sector for UE 110 and eNB 112 after UE 110 is attached including adaptation flows for both calibrated scenarios, in which uplink (UL) and downlink (DL) directional reciprocity may be assumed, and uncalibrated scenarios.

In one or more embodiments terminology of a Long Term Evolution (LTE) terminology such as UE 110 or eNB 112 may be utilized to identify a node that may share similar logical and/or conceptual functionalities in a Fifth Generation (5G) standard as the names for such nodes in a 5G system have not been finalized in the Third Generation Partnership Project (3GPP) standards yet, and the scope of the claimed subject matter is not limited in these respects. For periodic UE RXSS and eNB TXSS, a periodic UE RXSS channel and a periodic eNB TXSS channel may be utilized. Tier-2 eNB TXSS may be allocated with a fixed interval after UE-RXSS. A reference signal may be sent over a Tier-1 eNB sector and a Tier-2 eNB sector during UE RXSS and eNB TXSS, respectively. The reference signal during UE RXSS indicates Cell ID and Tier-1 eNB sector index, and the reference signal during eNB TXSS indicates Cell ID and Tier-2 eNB sector index.

For Tier-1 sector identification based on a physical downlink control channel (PDCCH), UE 110 may identify the Tier-1 eNB sector based on the downlink control channel. Specifically, eNB 112 may send out a downlink control message and/or signal with a fixed time offset after the UE RXSS. The control signal may be sent with the Tier-1 sectors that are used for UE RXSS, and carry the Tier-1 sector index information. For example, the PDCCH may carry the Tier-1 sector index info, and eNB 112 sends out the PDCCH in one or more subframes after every UE RXSS even if there is no activity to schedule.

For eNB Tier-2 sector adaptation, a Tier-1 specific UE adaptation procedure may be utilized, or a Tier-2 eNB sector adaptation procedure may be used for a single UE 110 or a group of UEs in which eNB 112 sends SSS with TXSS only on its Tier-2 sectors that corresponds to a Tier-1 sector, and UE 110 receives with its best UE sector to select its best Tier-2 eNB sector. In such an arrangement it may be assumed that UE 110 has already selected its best Tier-1 eNB sector, therefore UE 110 only needs to select its best Tier-2 eNB sector among those that correspond to its Tier-1 eNB sector. A Tier-1 specific UE or Tier-2 eNB sector adaptation procedure may be scheduled dynamically by eNB 112 and may be triggered by any of the following conditions: a change of the best Tier-1 eNB sector for UE 110; hybrid automatic repeat request (HARQ) retransmission failure, or a channel quality indicator (CQI) report indicating the quality degradation or loss of the link over the current Tier-2 eNB sector for UE 110. The procedure also may be extended to cover a scenario without channel reciprocity.

In one or more embodiments, Tier-1 sector identification may be based on a downlink control channel, for example a physical downlink control channel (PDCCH), and may comprise the following operations. In a first operation, eNB 112 sends out a downlink control message and/or signal with a fixed time offset after UE RXSS, and the control signal may be sent over the Tier-1 sector and may carry the Tier-1 sector index information. For example, the PDCCH may be embedded with the Tier-1 sector index information, and eNB 112 may send out the PDCCH in one or more subframes after every UE RXSS even if there is nothing to schedule). UE 110 may receive the downlink control message with its best UE sector, and may decode the Tier-1 sector index information. In a second operation, if UE 110 detects that its Tier-1 sector has changed, UE 110 may perform random access and report its updated Tier-1 eNB sector index to eNB 112.

In one or more embodiments, periodic UE and/or eNB Sector adaptation may include the following system parameter, defined below.

T: the period of UE RXSS/eNB TXSS in the unit of frame (e.g. 4 frames)

t: the time offset for eNB TXSS in the unit of subframe (e.g. 1 subframe)

N1: the interval of UE RXSS in the unit of symbols

N2: the interval of eNB TXSS in the unit of symbols

An example frame structure having periodic receive sector sweep (RXSS) and periodic transmit sector sweep (TXSS) is shown in and described with respect to FIG. 3, below.

Figure 3:
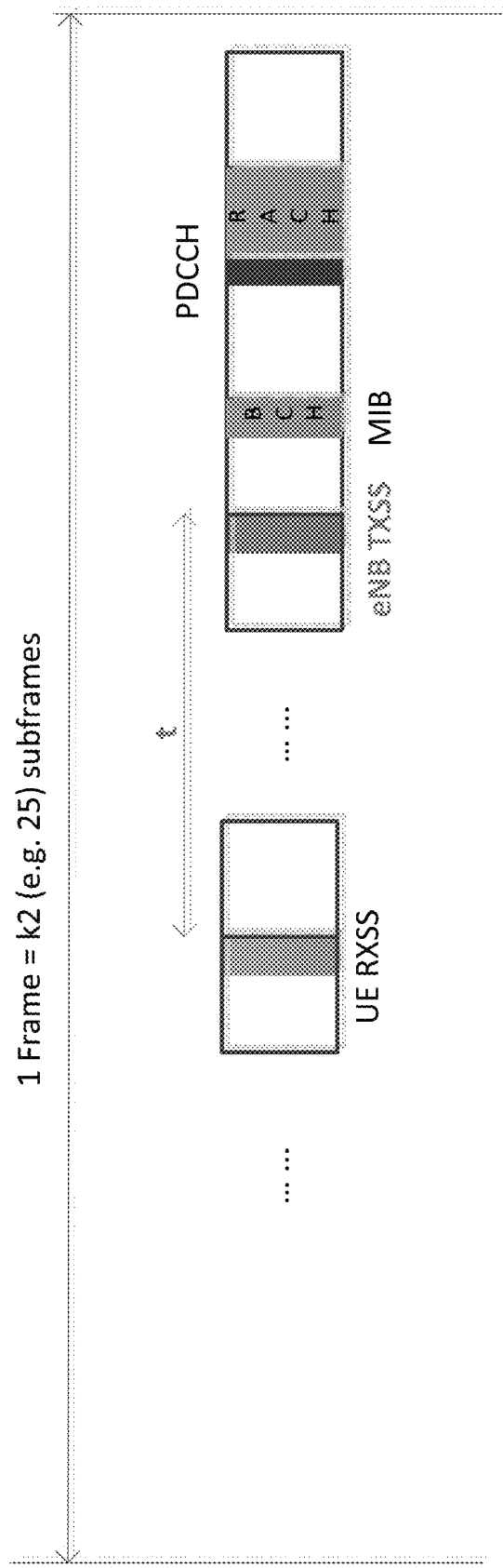
FIG. 3 is a diagram of an example frame structure with periodic receive sector sweep and transmit sector sweep in accordance with one or more embodiments.

Referring now to FIG. 3, a diagram of an example frame structure with periodic receive sector sweep and transmit sector sweep in accordance with one or more embodiments will be discussed. As show in FIG. 3, in frame structure 300 there is a fixed delay between UE RXSS and eNB TXSS. In addition, T, t, N1, and N2 may be broadcast by eNB 112 as part of a master information block (MIB) in a broadcast channel (BCH) so that UE 110 will know their values after initial acquisition.

Figure 4:
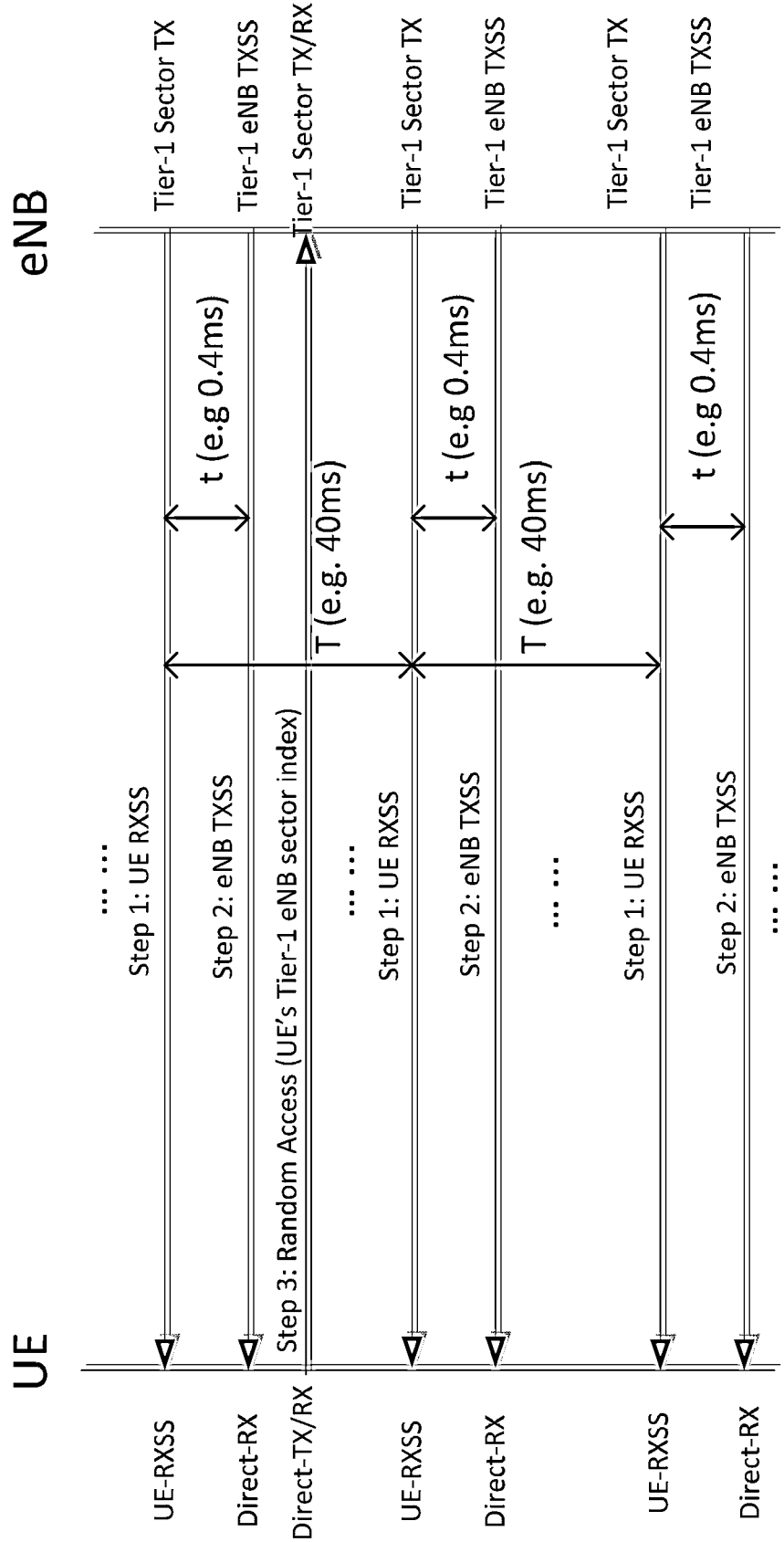
FIG. 4 is a diagram of periodic Tier-1 evolved Node B (eNB) adaptation procedure in accordance with one or more embodiments.

Referring now to FIG. 4, a diagram of periodic Tier-1 evolved Node B (eNB) adaptation procedure in accordance with one or more embodiments will be discussed. FIG. 4 shows the proposed periodic UE/eNB sector adaptation procedure comprising the following three operations. In a first operation, eNB 112 sends a reference signal, for example a Beam Reference Signal (BRS), repeatedly over a Tier-1 eNB sector, and UE 110 performs RXSS to select its best UE sectors and identify the Tier-1 eNB sector. Time, frequency, and/or code for sending BRS during UE RXSS may be used to identify the Tier-1 eNB sector index. In a second operation, eNB 112 sends out a reference signal, for example a Beam Reference Signal (BRS) over its Tier-2 sectors using TXSS with a fixed time offset (t) after the first operation. UE 112 will then receive with its best UE sectors as found in the first operation to select the best Tier-2 eNB sectors. Similarly, time, frequency, and/or code for sending BRS during eNB TXSS may be used to identify the Tier-2 eNB sector index. In a third operation, if UE 110 detects its Tier-1 sector has changed, UE 110 will perform random access and report its updated Tier-1 and Tier-2 eNB sector index to eNB 112; otherwise, it will wait for the next UE RXSS/eNB TXSS opportunity.

In procedure 400 of FIG. 4, it is assumed that the reference signal is sent for UE RXSS over all Tier-1 sectors simultaneously. If eNB 112 can only send the reference signal for UE RXSS over a subset of its Tier-1 sectors for every UE RXSS allocation, procedure 400 may be extended with the following two options. In a first option, one eNB TXSS per UE RXSS allocation may be used, and eNB 112 may schedule an eNB TXSS allocation with a fixed time offset after each UE RXSS, and may only scan the Tier-2 sectors that are associated with the Tier-1 sectors used for UE RXSS. UE 110 may perform random access immediately after a better Tier-1 eNB sector is detected, or wait until finishing UE RXSS on all Tier-1 sectors in a cycle. In a second option, one eNB TXSS per UE RXSS cycle may be used, eNB 112 may schedule an eNB TXSS allocation with a fixed offset after the last UE RXSS of a cycle and may scan all its Tier-2 sectors at once.

Figure 5A:
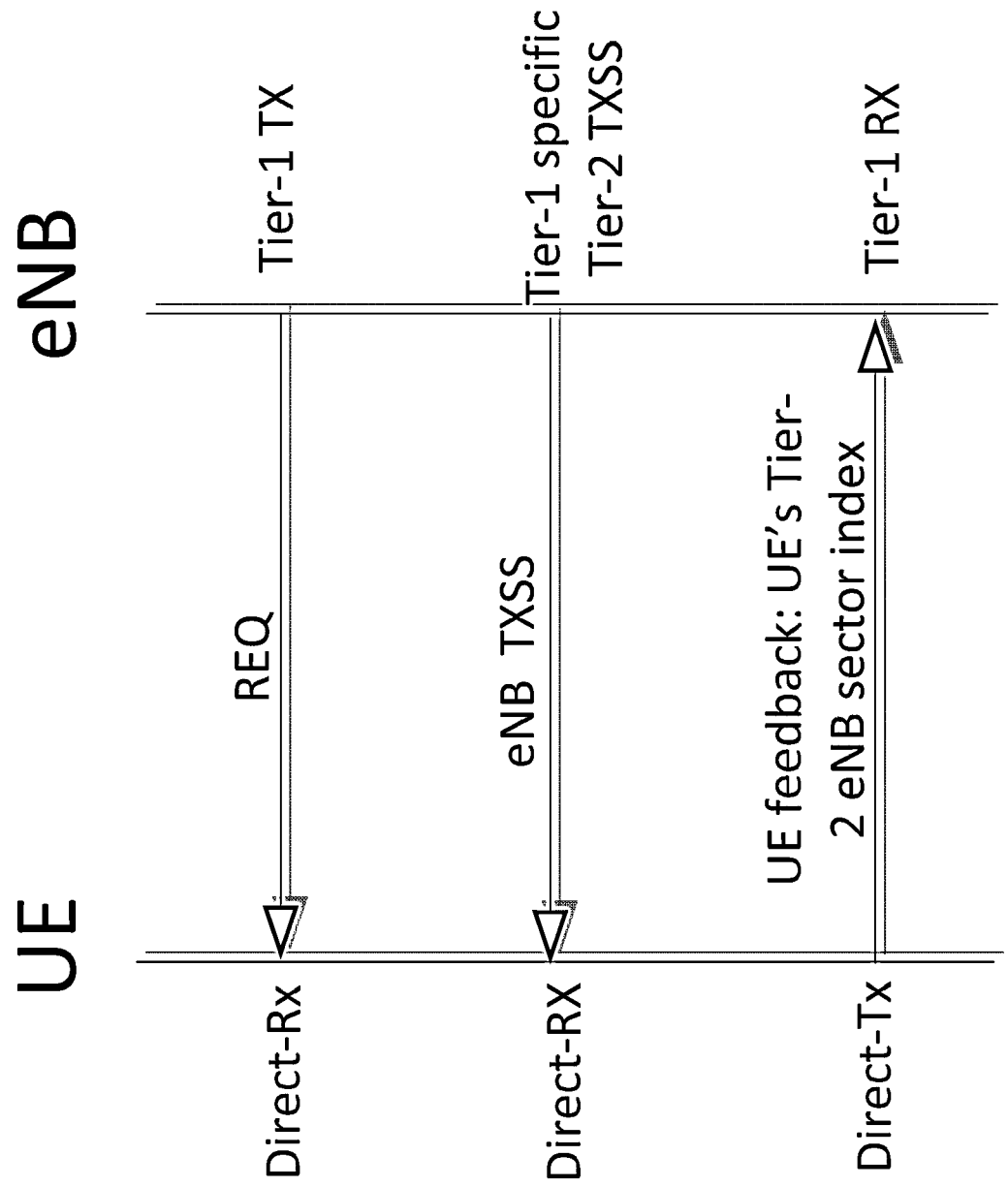
FIG. 5A and FIG. 5B are diagrams of triggered sector adaptation procedure with channel reciprocity and without channel reciprocity in accordance with one or more embodiments.
Figure 5B:
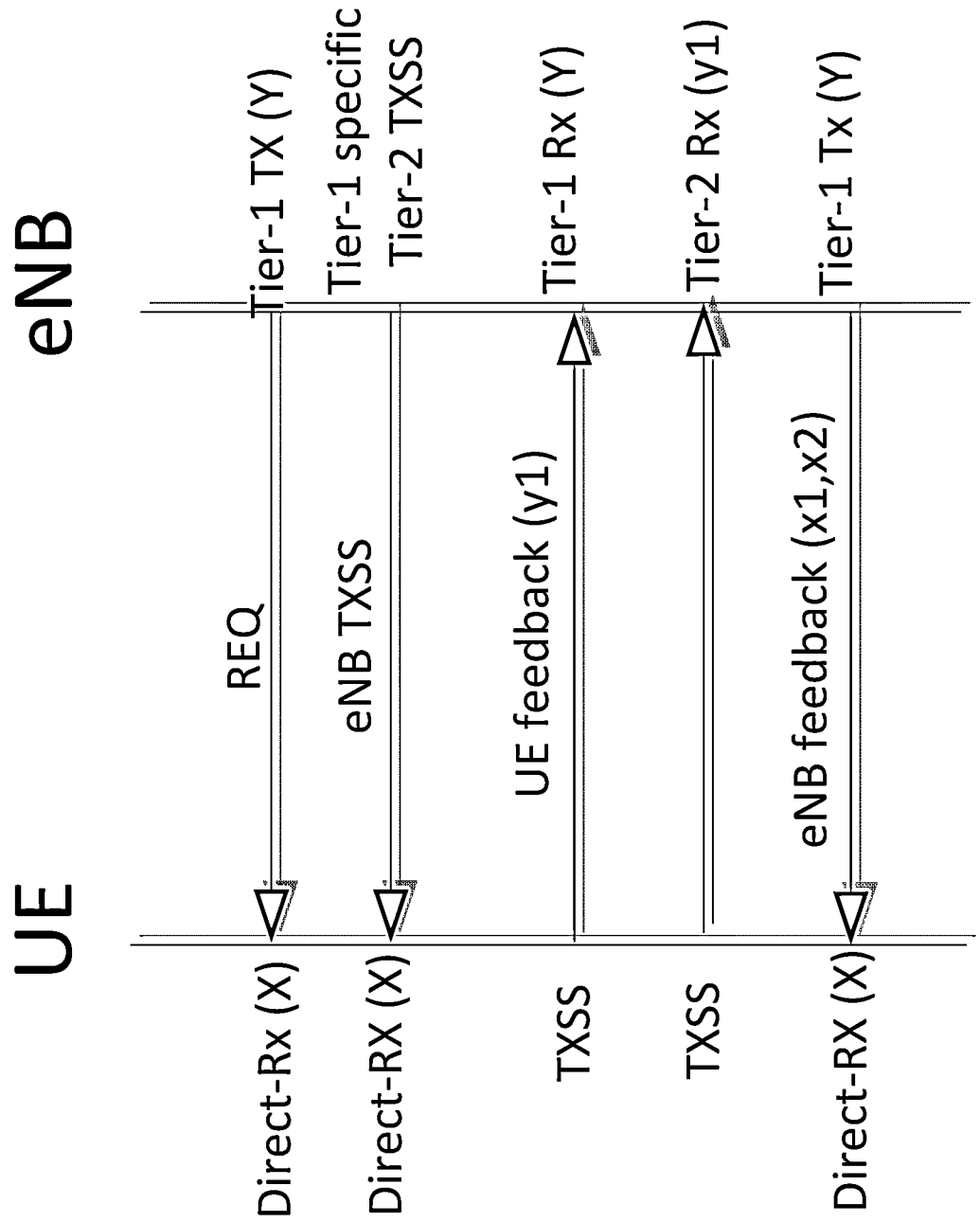

Referring now to FIG. 5A and FIG. 5B, diagrams of triggered sector adaptation procedure with channel reciprocity and without channel reciprocity in accordance with one or more embodiments will be discussed. A triggered adaptation procedure 510 with channel reciprocity is shown FIG. 5A, and a triggered adaptation procedure 512 without channel reciprocity is shown in FIG. 5B. The triggered Tier-1 specific UE/eNB sector adaptation procedures cover the following scenarios. For a procedure 510 with channel reciprocity, the channel over the Tier-2 eNB sector is symmetric, and therefore the same Tier-2 eNB sector may be used for both TX and RX, and the same UE sector will be used for TX and RX. For a procedure 512 without channel reciprocity, the channel over the Tier-2 eNB sector is not symmetric, and therefore a different Tier-2 eNB sector may be used for TX and RX. As a result, UE 110 also may use different sectors for TX and RX.

Regardless of whether or not there is channel reciprocity, procedure 510 or procedure 512 may be initiated by eNB 112 under any of the following conditions: HARQ failure, change of the Tier-1 eNB sector for UE 110 due to channel variation or blockage, and/or a CQI report indicating the quality degradation or loss of the link over the current Tier-2 eNB sector for UE 110. For procedure 510, the Tier-1 specific Tier-2 eNB sector adaptation with channel reciprocity may comprise the following three operations. In a first operation, eNB 112 sends out a request (REQ) message to initiate the procedure. The REQ message may be embedded as part of the PDCCH or allocated separately anywhere in a subframe. The REQ message may provide the UE identifier (ID) and the allocation information about where the following procedures: Tier-1 eNB TXSS and UE feedback allocation. The eNB 112 also may indicate the UE report type as follows:

Type 1: report CQI for all Tier-2 eNB sectors that are used in operation two, below Type 2: report CQI for the best K1 eNB sectors, for example based on received signal strength Type 3: report CQI for the best K1 eNB sectors and the worst K2 eNB sectors Type 4: report CQI for the eNB sectors whose received signal strength is above S1

Type 5: report CQI for the eNB sectors whose received signal strength is above S1 or below S2

In the above report types, the parameters K1, K2, S1, and S2 may be configured by eNB 112.

In a second operation, eNB 112 sends a reference signal, for example a beam reference signal (BRS), consecutively with TXSS over a subset of its Tier-2 sectors that correspond to the Tier-1 sector that eNB 112 uses to send the REQ. In the meantime, UE 110 receives the reference signal with its best UE sector to select the best Tier-2 eNB sector. In a third operation, UE 110 reports CQI and Tier-2 eNB sector index for the selected Tier-2 eNB sectors based on the UE report type to eNB 112 in a UE feedback message.

It should be noted that procedure 510 FIG. 5A also may apply to a group of UEs that share the same Tier-1 eNB sector. In the REQ message, eNB 112 should provide a list of UEs that are requested for the following eNB TXSS. As a result, these UEs will be listening at operation two, above, and then will report their feedback at operation three, above. Because the number of symbols for UE feedback from an individual UE may be fixed, for example fixed at one symbol, an UE will know when it should send out its feedback based on where it is on the UE list in the REQ message.

In one or more embodiments, procedure 512 of FIG. 5B may be utilized if the channel is not symmetric. In such embodiments, it is assumed that UE 110 has already selected its best UE Rx sector (X) and its best Tier-1 eNB Tx sector (Y) for the downlink control channel, for example for the PDCCH. The objective is to find the best UE Tx sector (x1) for uplink control channel, and the best Tier-2 eNB Tx sector (y1) and Rx sector (y2) for data channel as shown in Table 1, below.

TABLE 1

UE and eNB Sector Pairs for Control and Data Channel

| | UE Sector Index | eNB Tier 1 Sector Index | eNB Tier 2 Sector Index |
|---|---|---|---|
| Downlink Control Channel (e.g. PDCCH) | X | Y | N/A |
| Uplink Control Channel (e.g. PUCCH) | x1 | Y | N/A |
| Downlink Data Channel | X | N/A | y1 |
| Uplink Data Channel | x2 | N/A | y1 |

Accordingly, in one or more embodiments the sector adaptation procedure 512 without channel reciprocity may comprise the following five operations. In a first operation, eNB 112 sends a REQ message to initiate the procedure. The REQ message may be embedded as part of the PDCCH or allocated separately anywhere in a frame. The REQ message may provide the UE ID and the information about where the following items: eNB TXSS, UE Feedback/UE TXSS for the control channel, UE TXSS for the data channel, and eNB feedback allocation. In a second operation, eNB 112 sends a reference signal consecutively with TXSS over a subset of its Tier-2 sectors that correspond to the Tier-1 sector that eNB 112 uses to send the REQ. In the meantime, UE 110 receives with its best UE Rx sector (X) to select the best Tier-2 eNB sector index (y1). In a third operation, UE 110 sends a UE feedback message consecutively with TXSS over its sectors while eNB 112 is receiving with its Tier-1 sector (Y) to select the best UE TX sector (x1) for the control channel. The UE 110 feedback message carries the best Tier-2 eNB sector index (y1) for UE 110.

In a fourth operation, UE 110 sends a reference signal consecutively with TXSS over its sectors, and eNB 112 receives with the Tier-2 sector (y1) to select the best UE TX sector (x2) for the data channel. In a fifth operation, eNB 112 sends out an eNB feedback message to notify UE 110 its best UE TX sector index (x1, x2). It should be noted that procedure 512 of FIG. 5B also may apply to a group of UEs that share the same Tier-1 sector.

Figures 6A, 6B:
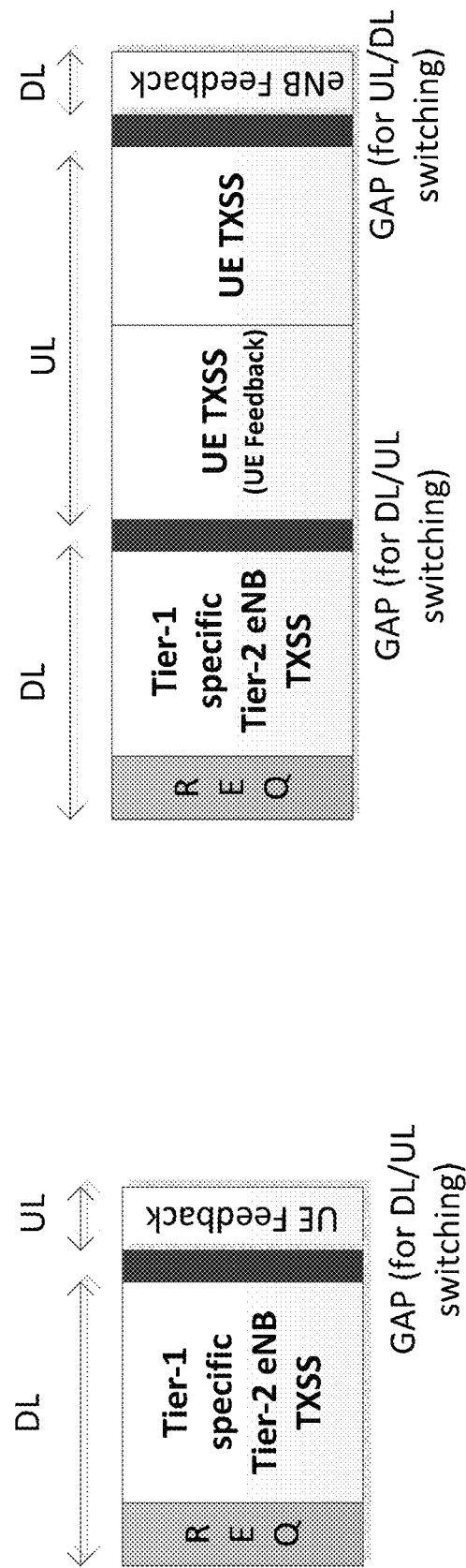
FIG. 6A and FIG. 6B are diagrams of example allocations for sector adaptation with channel reciprocity and without channel reciprocity in accordance with one or more embodiments.

Referring now to FIG. 6A and FIG. 6B, diagrams of example allocations for sector adaptation with channel reciprocity and without channel reciprocity in accordance with one or more embodiments will be discussed. FIG. 6A shows an downlink/uplink (DL/UL) allocation 610 for sector adaptation with channel reciprocity, and FIG. 6B shows a DL/UL allocation 612 for sector adaptation without channel reciprocity, for Tier-1 specific Tier-2 eNB sector adaptation. It should be noted that the subject matter disclosed herein is made in the context of a Fifth Generation (5G) radio access technology (RAT) for licensed bands, the principles discussed herein are general in nature, and may be applied to alternative designs and/or contexts. For example, the subject matter herein may apply to alternate mmWave access systems such as Wireless Gigabit Alliance (WiGiG) standard and/or an Institute of Electrical and Electronics Engineers (IEEE) 802.11ay standard, or potentially to any other massive multiple-input, multiple-output (MIMO) systems involving directional acquisition. While the optimizations are described herein in the context of a specific frame structure, the principles thereof may have general applicability and may be applied with alternative frame structures or multi-access schemes, and the scope of the claimed subject matter is not limited in these respects.

Figure 7:
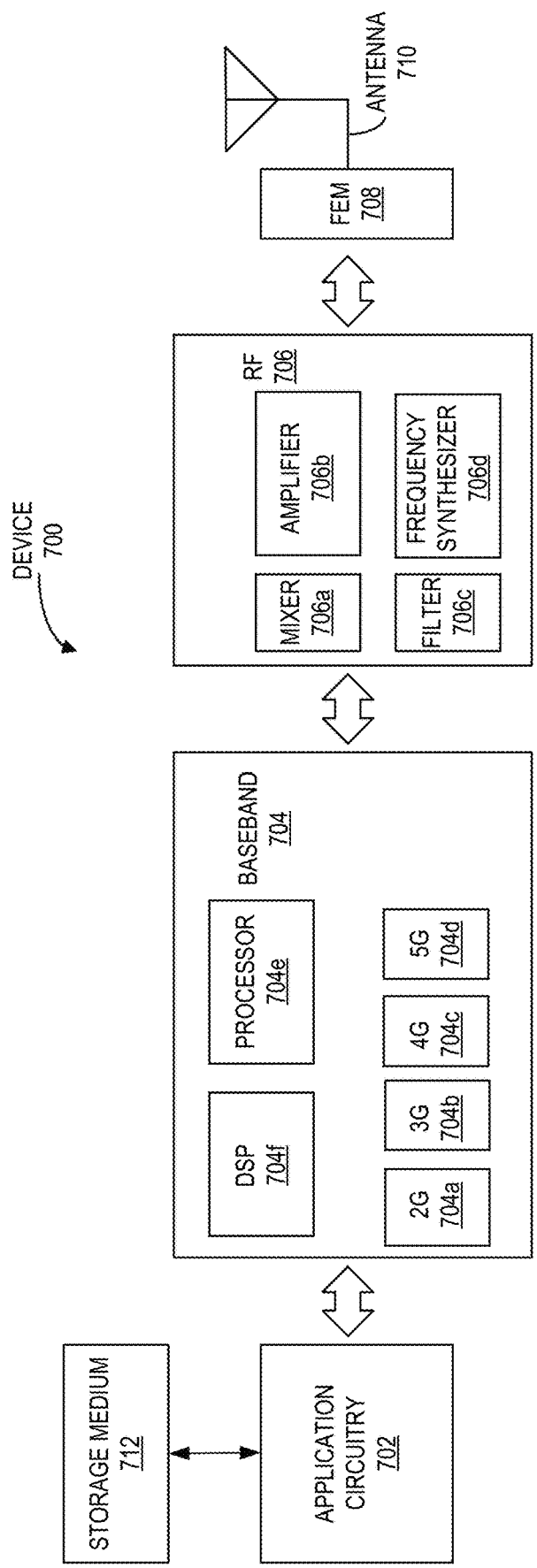
FIG. 7 is a diagram of example components of a wireless device in accordance with one or more embodiments.

Referring now to FIG. 7, example components of a wireless device such as an evolved NodeB (eNB) 110 device or a User Equipment (UE) 116 device in accordance with one or more embodiments will be discussed. In some embodiments, device 700 may include application circuitry 702, computer readable storage medium or media 712, baseband circuitry 704, Radio Frequency (RF) circuitry 706, front-end module (FEM) circuitry 708 and one or more antennas 710, coupled together at least as shown. In other embodiments, the above described circuitries may be included in various devices, in whole or in part, for example an eNB 110 according to a cloud-RAN (C-RAN) implementation, and the scope of the claimed subject matter is not limited in these respects. Computer readable medium or media 712 may comprise one or more of various types of memory or storage devices including volatile memory and/or non-volatile memory, for example flash memory, dynamic random-access memory (DRAM), static random-access memory (SRAM), NOT OR (NOR) memory, and/or NOT AND (NAND) memory, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Application circuitry 702 may include one or more application processors. For example, application circuitry 702 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 704 may include circuitry such as, but not limited to, one or more single-core or multi-core processors. Baseband circuitry 704 may include one or more baseband processors and/or control logic to process baseband signals received from a receive signal path of RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or one or more other baseband processors 704d for other existing generations, generations in development or to be developed in the future, for example fifth generation (5G), sixth generation (6G), and so on. Baseband circuitry 704, for example one or more of baseband processors 704a through 704d, may handle various radio control functions that enable communication with one or more radio networks via RF circuitry 706. The radio control functions may include, but are not limited to, signal modulation and/or demodulation, encoding and/or decoding, radio frequency shifting, and so on. In some embodiments, modulation and/or demodulation circuitry of baseband circuitry 704 may include Fast-Fourier Transform (FFT), precoding, and/or constellation mapping and/or demapping functionality. In some embodiments, encoding and/or decoding circuitry of baseband circuitry 704 may include convolution, tail-biting convolution, turbo, Viterbi, and/or Low Density Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. Processor 704e of the baseband circuitry 704 may be configured to run elements of the protocol stack for signaling of the PHY, MAC, RLC, PDCP and/or RRC layers. In some embodiments, the baseband circuitry may include one or more audio digital signal processors (DSP) 704f. The one or more audio DSPs 704f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 704 and application circuitry 702 may be implemented together such as, for example, on a system on a chip (SOC). In some embodiments, computer readable storage medium or media 712 may be disposed in whole or at least in part on a separate chip from application circuitry 702, and in other embodiments may be integrated in whole or at least in part on application circuitry 702, although the scope of the claimed subject matter is not limited in these respects.

In some embodiments, baseband circuitry 704 may provide for communication compatible with one or more radio technologies. For example, in some embodiments, baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, RF circuitry 706 may include switches, filters, amplifiers, and so on, to facilitate the communication with the wireless network. RF circuitry 706 may include a receive signal path which may include circuitry to down-convert RF signals received from FEM circuitry 708 and provide baseband signals to baseband circuitry 704. RF circuitry 706 may also include a transmit signal path which may include circuitry to up-convert baseband signals provided by the baseband circuitry 704 and provide RF output signals to FEM circuitry 708 for transmission.

In some embodiments, RF circuitry 706 may include a receive signal path and a transmit signal path. The receive signal path of RF circuitry 706 may include mixer circuitry 706a, amplifier circuitry 706b and filter circuitry 706c. The transmit signal path of RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from FEM circuitry 708 based on the synthesized frequency provided by synthesizer circuitry 706d. Amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to baseband circuitry 704 for further processing. In some embodiments, the output baseband signals may be zero-frequency baseband signals, although this may be optional. In some embodiments, mixer circuitry 706a of the receive signal path may comprise passive mixers, although the scope of the embodiments is not limited in this respect.

In some embodiments, mixer circuitry 706a of the transmit signal path may be configured to up-convert input baseband signals based on the synthesized frequency provided by synthesizer circuitry 706d to generate RF output signals for FEM circuitry 708. The baseband signals may be provided by the baseband circuitry 704 and may be filtered by filter circuitry 706c. Filter circuitry 706c may include a low-pass filter (LPF), although the scope of the embodiments is not limited in this respect.

In some embodiments, mixer circuitry 706a of the receive signal path and the mixer circuitry 706a of the transmit signal path may include two or more mixers and may be arranged for quadrature down conversion and/or up conversion respectively. In some embodiments, mixer circuitry 706a of the receive signal path and the mixer circuitry 706a of the transmit signal path may include two or more mixers and may be arranged for image rejection, for example Hartley image rejection. In some embodiments, mixer circuitry 706a of the receive signal path and the mixer circuitry 706a may be arranged for direct down conversion and/or direct up conversion, respectively. In some embodiments, mixer circuitry 706a of the receive signal path and mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 706 may include analog-to-digital converter (ADC) and digital-to-analog converter (DAC) circuitry, and baseband circuitry 704 may include a digital baseband interface to communicate with RF circuitry 706. In some dual-mode embodiments, separate radio integrated circuit (IC) circuitry may be provided for processing signals for one or more spectra, although the scope of the embodiments is not limited in this respect.

In some embodiments, synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

Synthesizer circuitry 706d may be configured to synthesize an output frequency for use by mixer circuitry 706a of RF circuitry 706 based on a frequency input and a divider control input. In some embodiments, synthesizer circuitry 706d may be a fractional N/N+1 synthesizer.

In some embodiments, frequency input may be provided by a voltage controlled oscillator (VCO), although this may be optional. Divider control input may be provided by either baseband circuitry 704 or applications processor 702 depending on the desired output frequency. In some embodiments, a divider control input (e.g., N) may be determined from a look-up table based on a channel indicated by applications processor 702.

Synthesizer circuitry 706d of RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706*d* may be configured to generate a carrier frequency as the output frequency, while in other embodiments, the output frequency may be a multiple of the carrier frequency, for example twice the carrier frequency, four times the carrier frequency, and so on, and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, RF circuitry 706 may include an in-phase and quadrature (IQ) and/or polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by RF circuitry 706 for transmission by one or more of the one or more antennas 710.

In some embodiments, FEM circuitry 708 may include a transmit/receive (TX/RX) switch to switch between transmit mode and receive mode operation. FEM circuitry 708 may include a receive signal path and a transmit signal path. The receive signal path of FEM circuitry 708 may include a low-noise amplifier (LNA) to amplify received RF signals and to provide the amplified received RF signals as an output, for example to RF circuitry 706. The transmit signal path of FEM circuitry 708 may include a power amplifier (PA) to amplify input RF signals, for example provided by RF circuitry 706, and one or more filters to generate RF signals for subsequent transmission, for example by one or more of antennas 710. In some embodiments, device 700 may include additional elements such as, for example, memory and/or storage, display, camera, sensor, and/or input/output (I/O) interface, although the scope of the claimed subject matter is not limited in this respect.

The following are example implementations of the subject matter described herein. It should be noted that any of the examples and the variations thereof described herein may be used in any permutation or combination of any other one or more examples or variations, although the scope of the claimed subject matter is not limited in these respects. In example one, an apparatus of a user equipment (UE) comprises baseband circuitry including one or more processors to decode a secondary synchronization signal (SSS) or a beam reference signal (BRS) received from an evolved Node B (eNB) to select a Tier-1 sector for receiving downlink transmissions from the eNB, decode a downlink control channel message received from the eNB at one or more fixed time offsets after the UE decodes the SSS to obtain index information for the Tier-1 sector to identify the Tier-1 sector, and if the Tier-1 sector has changed, initiate a random access procedure to select an updated Tier-1 sector, and generate an updated Tier-1 sector index message to report to the eNB. In example two, the apparatus may include the subject matter of example one or any of the examples described herein, and further may comprise radio-frequency (RF) circuitry to receive the SSS and the downlink control channel message from the eNB. In example three, the apparatus may include the subject matter of example one or any of the examples described herein, wherein the downlink control channel comprises a broadcast channel (BCH). In example four, the apparatus may include the subject matter of example one or any of the examples described herein, wherein the downlink control channel comprises a physical downlink control channel (PDCCH).

In example five, an apparatus of a user equipment (UE) comprises baseband circuitry including one or more processors to decode a request from an evolved Node B (eNB) via a Tier-1 sector to perform Tier-2 sector adaptation with channel reciprocity, decode a secondary synchronization signal (SSS) or a beam reference signal (BRS) with an eNB transmit sector sweep (eNB TXSS) from the eNB for Tier-2 sectors corresponding to the Tier-1 sector to select a Tier-2 sector, and generate a feedback message for the eNB containing the selected Tier-2 index. In example six, the apparatus may include the subject matter of example five or any of the examples described herein, wherein the request is triggered in response to a change of The Tier-1 sector, hybrid automatic repeat request (HARQ) retransmission failure, a channel quality indicator (CQI) report indicating a link quality degradation or a link loss over the Tier-2 sector, or a combination thereof.

In example seven, an apparatus of a user equipment (UE) comprises baseband circuitry including one or more processors to decode a request from an evolved Node B (eNB) via a Tier-1 sector to perform Tier-2 sector adaptation without channel reciprocity, decode a secondary synchronization signal (SSS) or a beam reference signal (BRS) with an eNB transmit sector sweep (eNB TXSS) from the eNB over a subset of Tier-2 sectors corresponding to the Tier-1 sector to select a first Tier-2 sector for downlink transmissions, generate a feedback message with a UE transmit sector sweep (UE TXSS) for the eNB containing the selected first Tier-2 index for downlink transmissions, generate a control signal with a UE transmit sector sweep (UE TXSS) for the eNB, and decode a feedback message from the eNB containing the UE sector index for uplink control and data transmission respectively. In example eight, the apparatus may include the subject matter of example seven or any of the examples described herein, wherein the request is triggered in response to a change of The Tier-1 sector, hybrid automatic repeat request (HARQ) retransmission failure, a channel quality indicator (CQI) report indicating a link quality degradation or a link loss over the Tier-2 sector, or a combination thereof.

In example nine, an apparatus of a user equipment (UE) comprises baseband circuitry including one or more processors to decode a secondary synchronization signal (SSS) or a beam reference signal (BRS) with a UE receive sector sweep (UE RXSS) to select a Tier-1 sector for receiving downlink transmissions from the eNB, determine a best Tier-1 sector based on a timing, frequency info, or code of the SSS or BRS, and if the Tier-1 sector has changed, initiate a random access procedure to select an updated Tier-1 sector, and generate an updated Tier-1 sector index message to report to the eNB. In example ten, the apparatus may include the subject matter of example nine or any of the examples described herein, further comprising radio-frequency (RF) circuitry to receive the SSS or BRS with the eNB TXSS over the Tier-2 sectors from the eNB, so that UE can select its best Tier-2 sector. In example eleven, the apparatus may include the subject matter of example nine or any of the examples described herein, wherein one eNB TXSS is received at a fixed time offset after an allocation of a UE receive sector sweep (UE RXSS). In example twelve, the apparatus may include the subject matter of example nine or any of the examples described herein, wherein one eNB TXSS is received at a fixed time offset after completion of one cycle of UE receive sector sweeps (UE RXSSs).

In example thirteen, one or more computer-readable media have instructions stored thereon that, if executed by a user equipment (UE), result in decoding a secondary synchronization signal (SSS) or a beam reference signal (BRS) received from an evolved Node B (eNB) to select a Tier-1 sector for receiving downlink transmissions from the eNB, decoding a downlink control channel message received from the eNB at one or more fixed time offsets after the UE decodes the SSS or the BRS to obtain index information for the Tier-1 sector to identify the Tier-1 sector, and if the Tier-1 sector has changed, initiating a random access procedure to select an updated Tier-1 sector, and generating an updated Tier-1 sector index message to report to the eNB. In example fourteen, the one or more computer-readable media may include the subject matter of example thirteen or any of the examples described herein, wherein the downlink control channel comprises a broadcast channel (BCH). In example fifteen, the one or more computer-readable media may include the subject matter of example thirteen or any of the examples described herein, wherein the downlink control channel comprises a physical downlink control channel (PDCCH).

In example sixteen, one or more computer-readable media have instructions stored thereon that, if executed by a user equipment (UE), result in decoding a request from an evolved Node B (eNB) via a Tier-1 sector to perform Tier-2 sector adaptation with channel reciprocity, decoding a secondary synchronization signal (SSS) or a beam reference signal (BRS) with an eNB transmit sector sweep (eNB TXSS) from the eNB for Tier-2 sectors corresponding to the Tier-1 sector to select a Tier-2 sector, and generating a feedback message for the eNB containing the selected Tier-2 index. In example seventeen, the one or more computer-readable media may include the subject matter of example sixteen or any of the examples described herein, wherein the request is triggered in response to a change of The Tier-1 sector, hybrid automatic repeat request (HARQ) retransmission failure, a channel quality indicator (CQI) report indicating a link quality degradation or a link loss over the Tier-2 sector, or a combination thereof.

In example eighteen, one or more computer-readable media have instructions stored thereon that, if executed by a user equipment (UE), result in decoding a request from an evolved Node B (eNB) via a Tier-1 sector to perform Tier-2 sector adaptation without channel reciprocity, decoding a secondary synchronization signal (SSS) or a beam reference signal (BRS) with an eNB transmit sector sweep (eNB TXSS) from the eNB over a subset of Tier-2 sectors corresponding to the Tier-1 sector to select a first Tier-2 sector for downlink transmissions, generating a feedback message with a UE transmit sector sweep (UE TXSS) for the eNB containing the selected first Tier-2 index for downlink transmissions, generating a control signal with a UE transmit sector sweep (UE TXSS) for the eNB, and decoding a feedback message from the eNB containing the UE sector index for uplink control and data transmission respectively. In example nineteen, the one or more computer-readable media may include the subject matter of example eighteen or any of the examples described herein, wherein the request is triggered in response to a change of The Tier-1 sector, hybrid automatic repeat request (HARQ) retransmission failure, a channel quality indicator (CQI) report indicating a link quality degradation or a link loss over the Tier-2 sector, or a combination thereof.

In example twenty, one or more computer-readable media have instructions stored thereon that, if executed by a user equipment (UE), result in decoding a secondary synchronization signal (SSS) with a UE receive sector sweep (UE RXSS) received from the eNB to select a Tier-1 sector for receiving downlink transmissions from the eNB, determining a best Tier-1 sector based on a timing, frequency, code of the SSS or BRS, and if the Tier-1 sector has changed, initiating a random access procedure to select an updated Tier-1 sector, and generating an updated Tier-1 sector index message to report to the eNB. In example twenty-one, the one or more computer-readable media may include the subject matter of example twenty or any of the examples described herein, wherein one eNB TXSS over the Tier-2 sectors is received at a fixed time offset after an allocation of a UE receive sector sweep (UE RXSS). In example twenty-two, the one or more computer-readable media may include the subject matter of example twenty or any of the examples described herein, wherein one eNB transmit sector sweep (eNB TXSS) over the Tier-2 sectors is received at a fixed time offset after completion of one cycle of UE receive sector sweeps (UE RXSSs).

In example twenty-three, an apparatus of an evolved Node B (eNB) comprises baseband circuitry including one or more processors to encode a secondary synchronization signal (SSS) or a beam reference signal (BRS) received for a user equipment to select a Tier-1 sector for receiving downlink transmissions from the eNB, encode a downlink control channel message for the UE at one or more fixed time offsets after the UE decodes the SSS or BRS to include index information for the Tier-1 sector to identify the Tier-1 sector, and if the Tier-1 sector has changed, process a random access procedure to select an updated Tier-1 sector, and receive an updated Tier-1 sector index message to report from the UE. In example twenty-four, the apparatus may include the subject matter of example twenty-three or any of the examples described herein, and further may comprise radio-frequency (RF) circuitry to transmit the SSS and the downlink control channel message to the UE. In example twenty-five, the apparatus may include the subject matter of example twenty-three or any of the examples described herein, wherein the downlink control channel comprises a broadcast channel (BCH). In example twenty-six, the apparatus may include the subject matter of example twenty-three or any of the examples described herein, wherein the downlink control channel comprises a physical downlink control channel (PDCCH).

In example twenty-seven 27, an apparatus of an evolved Node B (eNB) comprises baseband circuitry including one or more processors to encode a secondary synchronization signal (SSS) or a beam reference signal (BRS) with a user equipment (UE) receive sector sweep (UE RXSS) for a user equipment (UE) to select a Tier-1 sector for receiving downlink transmissions from the eNB, and if the Tier-1 sector has changed, process a random access procedure to select an updated Tier-1 sector, and receive an updated Tier-1 sector index message to report from the UE. In example twenty-eight, the apparatus may include the subject matter of example twenty-seven or any of the examples described herein, further comprising radio-frequency (RF) circuitry to transmit the SSS or BRS with an eNB transmit sector sweep (eNB TXSS) over its Tier-2 sectors to the UE so that the UE can select a best Tier-2 sector. In example twenty-nine, the apparatus may include the subject matter of example twenty-seven or any of the examples described herein, wherein one eNB TXSS is sent at a fixed time offset after an allocation of a UE receive sector sweep (UE RXSS). In example thirty, the apparatus may include the subject matter of example twenty-seven or any of the examples described herein, wherein one eNB transmit sector sweep (eNB TXSS) is sent at a fixed time offset after completion of one cycle of UE receive sector sweeps (UE RXSSs).

In example thirty-one, an apparatus of a user equipment (UE), comprises means for decoding a secondary synchronization signal (SSS) or a beam reference signal (BRS) received from an evolved Node B (eNB) to select a Tier-1 sector for receiving downlink transmissions from the eNB, means for decoding a downlink control channel message received from the eNB at one or more fixed time offsets after the UE decodes the SSS or the BRS to obtain index information for the Tier-1 sector to identify the Tier-1 sector, and if the Tier-1 sector has changed, means for initiating a random access procedure to select an updated Tier-1 sector, and means for generating an updated Tier-1 sector index message to report to the eNB. In example thirty-two, the apparatus may include the subject matter of example thirty-one or any of the examples described herein, wherein the downlink control channel comprises a broadcast channel (BCH). In example thirty-three, the apparatus may include the subject matter of example twenty-seven or any of the examples described herein, wherein the downlink control channel comprises a physical downlink control channel (PDCCH).

In example thirty-four, an apparatus of a user equipment (UE), comprises means for decoding a request from an evolved Node B (eNB) via a Tier-1 sector to perform Tier-2 sector adaptation with channel reciprocity, means for decoding a secondary synchronization signal (SSS) or a beam reference signal (BRS) with an eNB transmit sector sweep (eNB TXSS) from the eNB for Tier-2 sectors corresponding to the Tier-1 sector to select a Tier-2 sector, and means for generating a feedback message for the eNB containing the selected Tier-2 index. In example thirty-five, the apparatus may include the subject matter of example thirty-four or any of the examples described herein, wherein the request is triggered in response to a change of The Tier-1 sector, hybrid automatic repeat request (HARQ) retransmission failure, a channel quality indicator (CQI) report indicating a link quality degradation or a link loss over the Tier-2 sector, or a combination thereof.

In example thirty-six, an apparatus of a user equipment (UE), comprises means for decoding a request from an evolved Node B (eNB) via a Tier-1 sector to perform Tier-2 sector adaptation without channel reciprocity, means for decoding a secondary synchronization signal (SSS) or a beam reference signal (BRS) with an eNB transmit sector sweep (eNB TXSS) from the eNB over a subset of Tier-2 sectors corresponding to the Tier-1 sector to select a first Tier-2 sector for downlink transmissions, means for generating a feedback message with a UE transmit sector sweep (UE TXSS) for the eNB containing the selected first Tier-2 index for downlink transmissions, means for generating a control signal with a UE transmit sector sweep (UE TXSS) for the eNB, and means for decoding a feedback message from the eNB containing the UE sector index for uplink control and data transmission respectively. In example thirty-seven, the apparatus may include the subject matter of example thirty-six or any of the examples described herein, wherein the request is triggered in response to a change of The Tier-1 sector, hybrid automatic repeat request (HARQ) retransmission failure, a channel quality indicator (CQI) report indicating a link quality degradation or a link loss over the Tier-2 sector, or a combination thereof.

In example thirty-eight, an apparatus of a user equipment (UE), comprises means for decoding a secondary synchronization signal (SSS) with a UE receive sector sweep (UE RXSS) received from the eNB to select a Tier-1 sector for receiving downlink transmissions from the eNB, means for determining a best Tier-1 sector based on a timing, frequency, code of the SSS or BRS, means for initiating a random access procedure to select an updated Tier-1 sector and if the Tier-1 sector has changed, and means for generating an updated Tier-1 sector index message to report to the eNB and if the Tier-1 sector has changed. In example thirty-nine, the apparatus may include the subject matter of example thirty-eight or any of the examples described herein, wherein one eNB TXSS over the Tier-2 sectors is received at a fixed time offset after an allocation of a UE receive sector sweep (UE RXSS). In example forty, the apparatus may include the subject matter of example thirty-eight or any of the examples described herein, wherein one eNB transmit sector sweep (eNB TXSS) over the Tier-2 sectors is received at a fixed time offset after completion of one cycle of UE receive sector sweeps (UE RXSSs).

Although the claimed subject matter has been described with a certain degree of particularity, it should be recognized that elements thereof may be altered by persons skilled in the art without departing from the spirit and/or scope of claimed subject matter. It is believed that the subject matter pertaining to two-tier sector RF beamforming adaptation and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE) comprising baseband circuitry including one or more processors to:
   decode a secondary synchronization signal (SSS) or a beam reference signal (BRS) received from an evolved Node B (eNB) to select a Tier-1 sector for receiving downlink transmissions from the eNB;
   decode a downlink control channel message received from the eNB via a downlink control channel at one or more fixed time offsets after the UE decodes the SSS to obtain index information for the Tier-1 sector to identify the Tier-1 sector; and
   if the Tier-1 sector has changed,
   initiate a random access procedure to select an updated Tier-1 sector; and
   generate an updated Tier-1 sector index message to report to the eNB.

2. The apparatus as claimed in claim 1, further comprising radio-frequency (RF) circuitry to receive the SSS and the downlink control channel message from the eNB.

3. The apparatus as claimed in claim 1, wherein the downlink control channel comprises a broadcast channel (BCH).

4. The apparatus as claimed in claim 1, wherein the downlink control channel comprises a physical downlink control channel (PDCCH).

5. One or more non-transitory computer-readable media having instructions stored thereon that, if executed by a user equipment (UE), result in:
- decoding a secondary synchronization signal (SSS) or a beam reference signal (BRS) received from an evolved Node B (eNB) to select a Tier-1 sector for receiving downlink transmissions from the eNB;
- decoding a downlink control channel message received from the eNB via a downlink control channel at one or more fixed time offsets after the UE decodes the SSS or the BRS to obtain index information for the Tier-1 sector to identify the Tier-1 sector; and
- if the Tier-1 sector has changed,
- initiating a random access procedure to select an updated Tier-1 sector; and
- generating an updated Tier-1 sector index message to report to the eNB.

6. The one or more non-transitory computer-readable media as claimed in claim 5, wherein the downlink control channel comprises a broadcast channel (BCH).

7. The one or more non-transitory computer-readable media as claimed in claim 5, wherein the downlink control channel comprises a physical downlink control channel (PDCCH).

* * * * *